US012571810B2

(12) United States Patent
Masuda

(10) Patent No.: US 12,571,810 B2
(45) Date of Patent: Mar. 10, 2026

(54) FLUID REMAINING AMOUNT MANAGEMENT DEVICE, ANALYSIS SYSTEM, FLUID REMAINING AMOUNT MANAGEMENT METHOD AND NON-TRANSITORY READABLE MEDIUM STORING FLUID REMAINING AMOUNT MANAGEMENT PROGRAM

(71) Applicant: SHIMADZU CORPORATION, Kyoto (JP)

(72) Inventor: Shingo Masuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 672 days.

(21) Appl. No.: 17/264,154

(22) PCT Filed: Aug. 7, 2018

(86) PCT No.: PCT/JP2018/029685
§ 371 (c)(1),
(2) Date: Jan. 28, 2021

(87) PCT Pub. No.: WO2020/031276
PCT Pub. Date: Feb. 13, 2020

(65) Prior Publication Data
US 2021/0231694 A1      Jul. 29, 2021

(51) Int. Cl.
*G01N 35/00* (2006.01)
*G01N 30/86* (2006.01)
(52) U.S. Cl.
CPC . *G01N 35/00712* (2013.01); *G01N 35/00871* (2013.01); *G01N 35/0092* (2013.01); *G01N 30/86* (2013.01); *G01N 2035/009* (2013.01)
(58) Field of Classification Search
CPC ....... G01N 35/00712; G01N 35/00871; G01N 35/0092; G01N 30/86; G01N 2035/00
See application file for complete search history.

(56) References Cited

U.S. PATENT DOCUMENTS 9,227,190 B2 *  1/2016  Kondou .................... B01L 9/06
9,261,523 B2 *  2/2016  Fritchie ........... G01N 35/00663
(Continued)

FOREIGN PATENT DOCUMENTS

CN        102759611 A    10/2012
JP      2000-121620 A     4/2000
(Continued)

OTHER PUBLICATIONS

Office Action issued from Taiwanese Patent Application No. 108125808 issued on May 13, 2020.
International Search Report for PCT/JP2018/029685 dated Nov. 6, 2018 (PCT/ISA/210).
Written Opinion for PCT/JP2018/029685 dated Nov. 6, 2018 (PCT/ISA/237).
(Continued)

*Primary Examiner* — Paresh Patel
*Assistant Examiner* — Dilara Sultana
(74) *Attorney, Agent, or Firm* — Sughrue Mion, PLLC

(57) ABSTRACT
An analysis system includes one or a plurality of analysis devices and a fluid remaining amount management device. The one or plurality of analysis devices perform an analysis using fluid supplied from a gas cylinder that is used as a fluid source. The fluid remaining amount management device includes a scheduled usage amount estimator and a remaining amount shortage time determiner. The scheduled usage amount estimator estimates transition of a scheduled usage amount of fluid to be used later than a current point in time in the one or plurality of analysis devices. A remaining amount shortage time determiner determines a remaining amount shortage time when a shortage of a remaining amount of fluid in each gas cylinder occurs based on the estimated transition of the scheduled usage amount.

11 Claims, 8 Drawing Sheets

(56)        References Cited

U.S. PATENT DOCUMENTS

| | | | | |
|---|---|---|---|---|
| 9,709,587 | B2 * | 7/2017 | Hagiwara | G01N 35/0092 |
| 2009/0281930 | A1 * | 11/2009 | Sakagami | G01N 35/00623 |
| | | | | 705/28 |
| 2010/0250174 | A1 * | 9/2010 | Tokunaga | G16H 10/40 |
| | | | | 702/83 |
| 2012/0003121 | A1 * | 1/2012 | Shibata | G01N 35/00603 |
| | | | | 422/63 |
| 2012/0179293 | A1 * | 7/2012 | Feingold | G16H 10/40 |
| | | | | 901/50 |
| 2012/0275956 | A1 * | 11/2012 | Wakamiya | G01N 35/00663 |
| | | | | 422/68.1 |
| 2013/0280130 | A1 * | 10/2013 | Sarwar | G01N 35/00663 |
| | | | | 422/63 |
| 2014/0039647 | A1 * | 2/2014 | Fukushima | G05B 15/02 |
| | | | | 700/73 |

FOREIGN PATENT DOCUMENTS

| | | | | |
|---|---|---|---|---|
| JP | 2000321283 | A | * | 11/2000 |
| JP | 2001083161 | A | * | 3/2001 |
| JP | 2012-237734 | A | | 12/2012 |
| JP | 2016-057148 | A | | 4/2016 |
| JP | 6281450 | B2 | | 2/2018 |

OTHER PUBLICATIONS

Communication dated Aug. 3, 2021 from the Japanese Patent Office in Application No. 2020-535381.

Office Action dated Jan. 28, 2023 from the Chinese Patent Office in Application No. 201880096427.2.

Office Action issued Sep. 12, 2023 in Chinese Application No. 201880096427.2.

* cited by examiner

F I G. 1
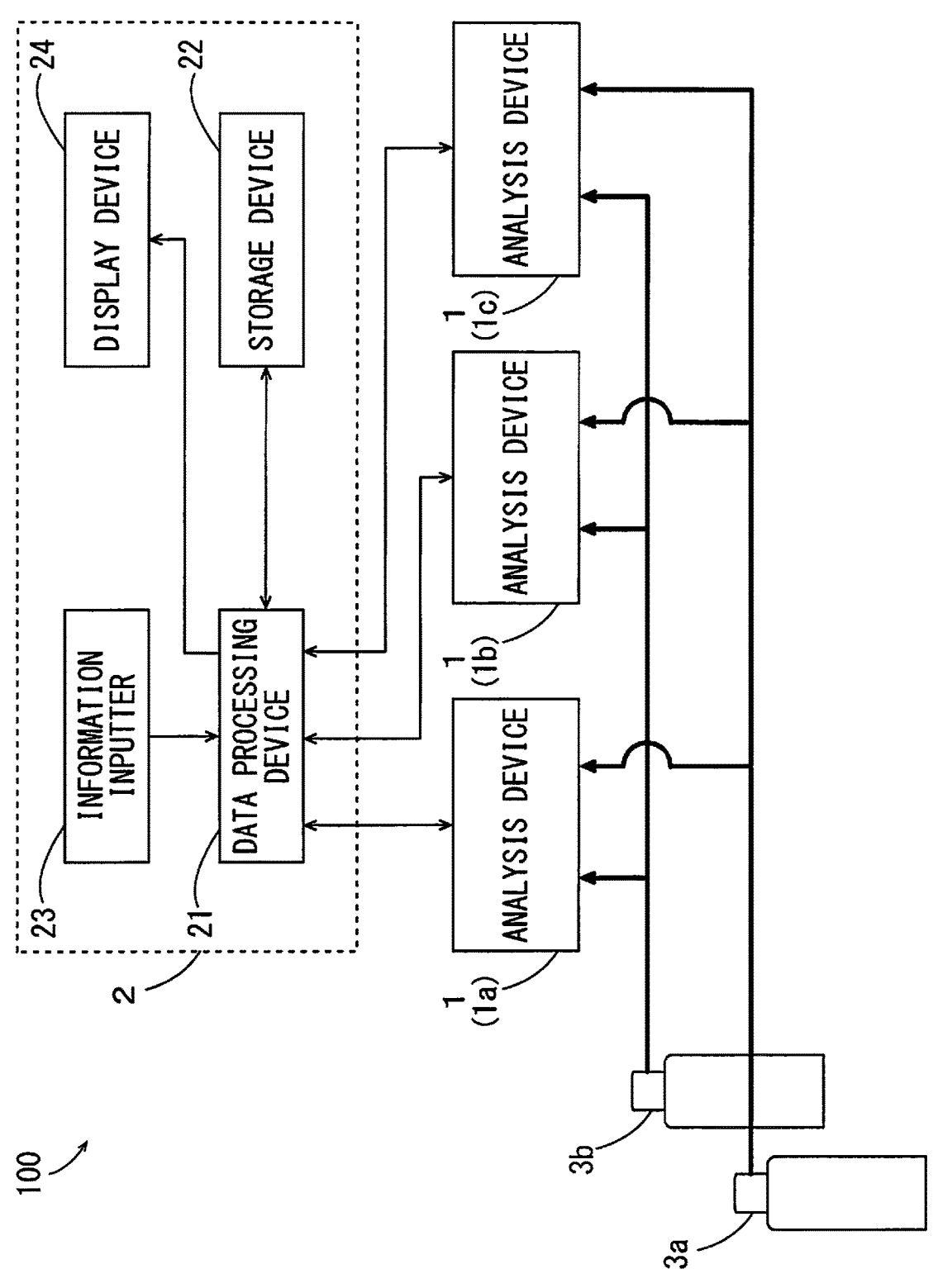

F I G. 3

ST

| SCHEDULE NUMBER | ANALYSIS NUMBER | NAME OF SAMPLE | NAME OF ANALYSIS METHOD FILE | |
|---|---|---|---|---|
| sa1 | a1 | A | Method-1 | ⋮ |
| | a2 | B | Method-1 | ⋮ |
| | a3 | C | Method-1 | ⋮ |
| | • • • | • • • | • • • | • • • |
| sa2 | b1 | D | Method-2 | ⋮ |
| | b2 | E | Method-2 | ⋮ |
| | b3 | F | Method-2 | ⋮ |
| | • • • | • • • | • • • | • • • |
| • • • | • • • | • • • | • • • | • • • |

F I G .  4
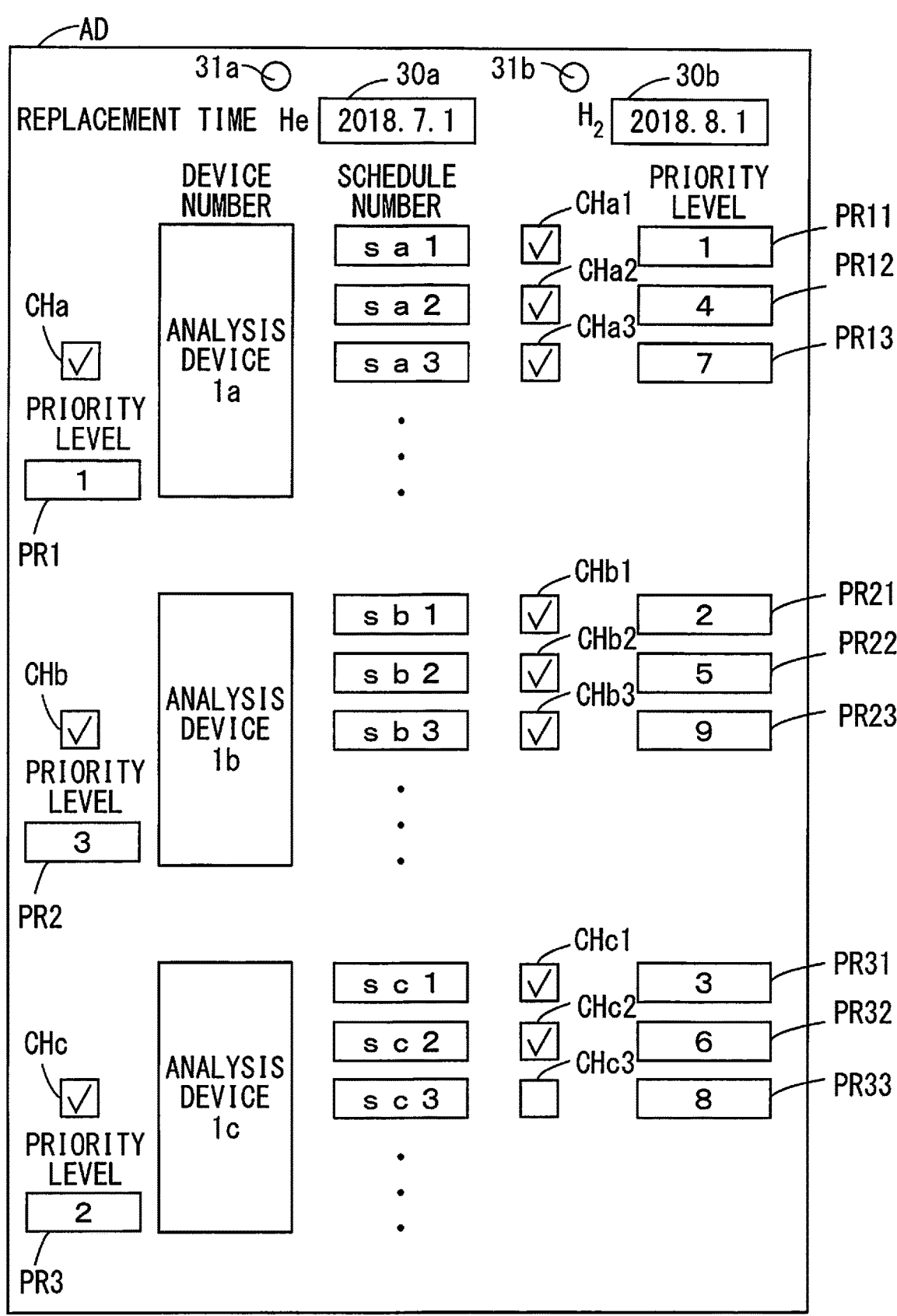

F I G. 6
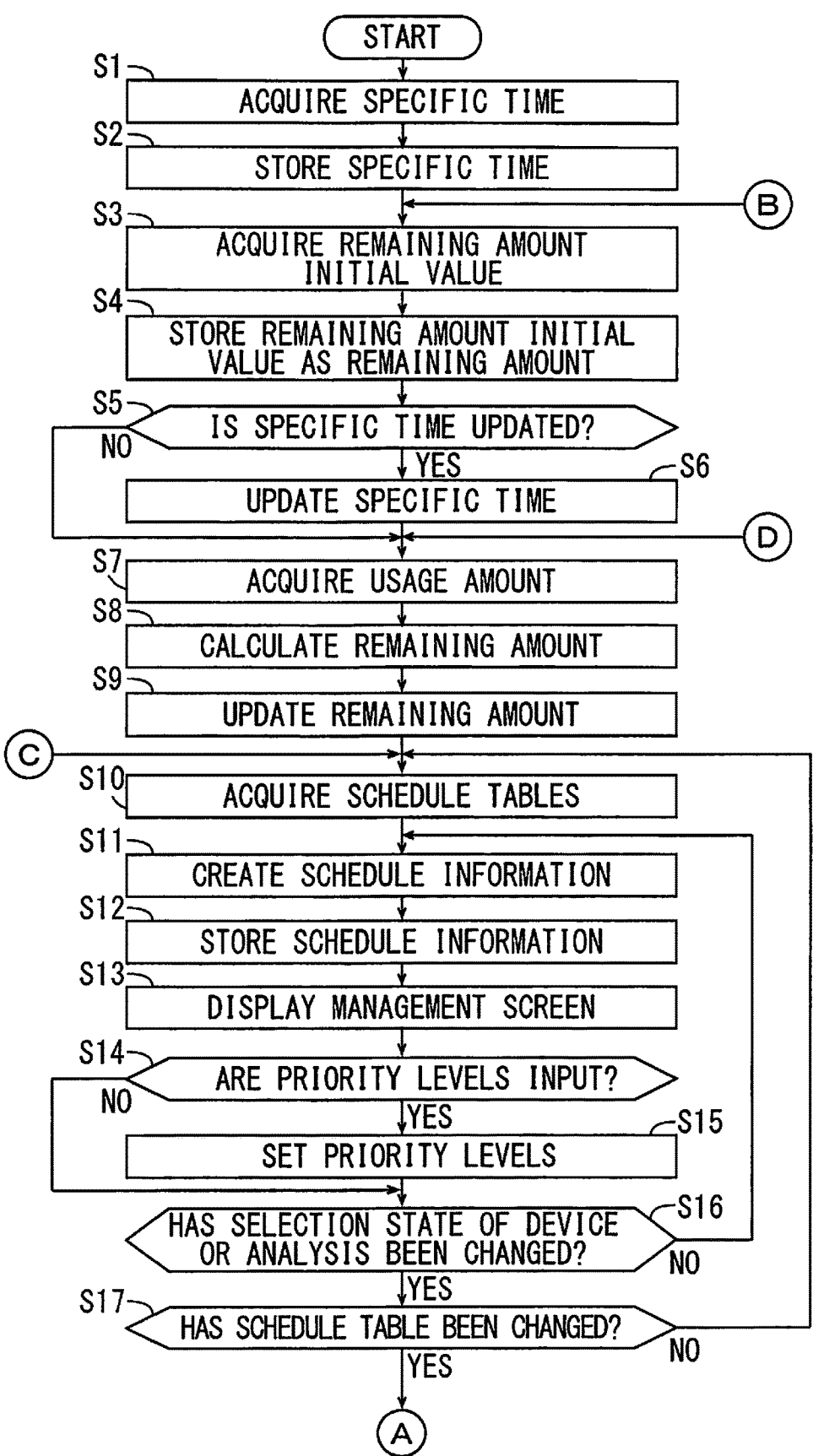

F I G .   7
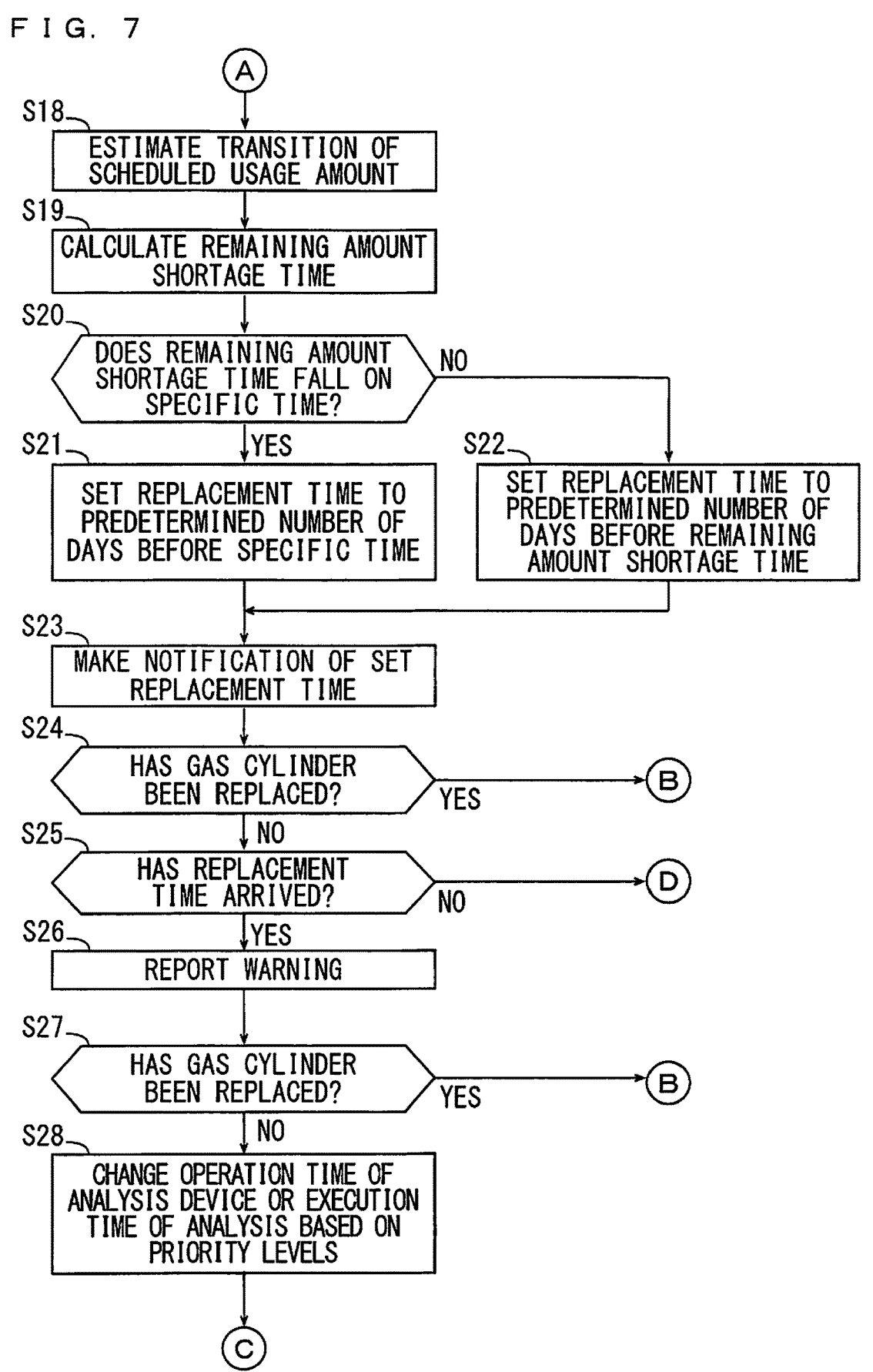

FLUID REMAINING AMOUNT MANAGEMENT DEVICE, ANALYSIS SYSTEM, FLUID REMAINING AMOUNT MANAGEMENT METHOD AND NON-TRANSITORY READABLE MEDIUM STORING FLUID REMAINING AMOUNT MANAGEMENT PROGRAM

CROSS REFERENCE TO RELATED APPLICATIONS

This application is a National Stage of International Application No. PCT/JP2018/029685 filed Aug. 7, 2018.

TECHNICAL FIELD

The present invention relates to a fluid remaining amount management device, an analysis system using the fluid remaining amount management device, a fluid remaining amount management method and a non-transitory readable medium storing a fluid remaining amount management program, for managing a remaining amount of fluid in a fluid source.

BACKGROUND ART

Various analysis devices that perform analyses using fluid such as gas or liquid are used. For example, in Patent Document 1, a gas chromatograph and a fluid control device used in the gas chromatograph are described. In the gas chromatograph, an analysis is performed by supply of a sample gas into a column together with a carrier gas. The fluid control device controls the supply of the carrier gas to the column. He (a helium gas), for example, is used as the carrier gas. In this case, a gas cylinder storing He is connected to the gas chromatograph.

[Patent Document 1] JP 2016-57148 A

SUMMARY OF INVENTION

Technical Problem

In the gas chromatograph, when the temperature of the column becomes high with no gas flowing in the column, a liquid phase is destroyed. Therefore, in a fluid control device having a supply pressure sensor of gas, an error is generated before a shortage of the gas in the gas cylinder occurs based on the supply pressure detected by the supply pressure sensor, and then the temperature control is stopped. Thus, the column is protected.

However, in a fluid control device not having the supply pressure sensor, a reduction in supply pressure of gas cannot be detected. For example, in a case where the detector of a gas chromatograph is a flame ionization detector (FID) or a flame thermionic detector (FTD), gas is supplied to a detector. Generally, the supply pressure sensor is not provided in a fluid control device for a detector. Therefore, it is not possible to predict the stop of an analysis of the gas chromatograph due to shortage of gas to be supplied to the detector.

Further, the pressure of gas in a gas cylinder is supplied to the gas chromatograph after being reduced by a pressure regulator. Therefore, the pressure detected by the supply pressure sensor is the pressure of gas supplied to the gas chromatograph and not the pressure of gas remaining in the gas cylinder (residual pressure). Therefore, it is difficult to identify a trend of the remaining amount in the gas cylinder based on the pressure detected by the supply pressure sensor.

Further, the period of time from the time when an error is generated due to a reduction in supply pressure detected by each supply pressure sensor to the time when a shortage of a remaining amount of gas in a gas cylinder occurs differs depending on the number of gas chromatographs connected to one gas cylinder. In a case where a large number of gas chromatographs are connected to one gas cylinder, a shortage of gas may occur right after an error is generated due to a reduction in supply pressure. As a result, the column may not be protected in time.

Further, it may be difficult to attach an electrical system including a sensor, etc. to a gas cylinder depending on the type of gas stored in the gas cylinder.

Not only the gas chromatograph is to have such a problem but also another analysis device using fluid such as gas or liquid may have such a problem.

An object of the present invention is to provide a fluid remaining amount management device, an analysis system using the fluid remaining amount management device, a fluid remaining amount management method and a non-transitory readable medium storing a fluid remaining amount management program that enables determination of a time when a shortage of a remaining amount of fluid in a fluid source occurs without direct detection of the remaining amount of fluid in the fluid source and regardless of the number of analysis devices connected to the fluid source.

Solution to Problem (1) A fluid remaining amount management device according to one aspect of the present invention that manages a remaining amount of fluid in a fluid source that supplies fluid to one or a plurality of analysis devices includes an estimator that estimates transition of a scheduled usage amount of fluid to be used later than a current point in time in the one or plurality of analysis devices, and a determiner that determines a remaining amount shortage time when a shortage of the remaining amount of fluid in the fluid source occurs, based on the transition of the scheduled usage amount that is estimated by the estimator.

With the fluid remaining amount management device, the transition of the scheduled usage amount of fluid to be used later than a current point in time in the one or plurality of analysis devices is estimated, and the remaining amount shortage time is determined based on the estimated transition of the scheduled usage amount. Thus, it is possible to determine the time when a shortage of the remaining amount of fluid in the fluid source occurs without direct detection of the remaining amount of fluid in the fluid source and regardless of the number of analysis devices connected to the fluid source. As a result, the fluid source can be replaced before a shortage of the remaining amount of fluid in the fluid source occurs, so that an analysis performed by the analysis device can be prevented from being stopped.

(2) The fluid remaining amount management device may further include a reporter that reports a warning indicating that the fluid source is to be replaced, at a time earlier than the remaining amount shortage time determined by the determiner. In this case, the user is prompted to replace the fluid source. Thus, the user can replace the fluid source before a shortage of the remaining amount of fluid in the fluid source occurs. Therefore, an analysis is prevented from being stopped due to shortage of the remaining amount of fluid.

(3) The estimator may estimate the transition of the scheduled usage amount based on a change in usage amount of fluid in the past in regard to the one or plurality of analysis devices. In this case, the transition of the scheduled usage amount can be easily estimated.

(4) The estimator may estimate the transition of the scheduled usage amount based on an analysis schedule in each of the one or plurality of analysis devices. In this case, the transition of the scheduled usage amount can be estimated relatively accurately.

(5) The reporter may report the warning at the time earlier than a specific time in a case where the remaining amount shortage time determined by the determiner falls on the specific time. In this case, in a case where it is difficult to replace the fluid source at the specific time, the fluid source can be replaced in advance.

(6) The fluid remaining amount management device may further include a first setter that sets priority levels for a plurality of analysis schedules in the one or plurality of analysis devices and a first changer that changes an execution time of at least part of the analysis schedules based on the priority levels set by the first setter such that the remaining amount shortage time does not fall on a specific time.

In this case, the execution time of an analysis schedule having a low priority level is changed, so that a shortage of the remaining amount of fluid in the fluid source is prevented from occurring at the specific time. Thus, an analysis schedule having a high priority level can be executed at the specific time.

(7) The fluid remaining amount management device may further include a second setter that sets a priority level for each of the plurality of analysis devices, and a second changer that changes an operation time of at least part of the analysis devices based on the priority levels set by the second setter such that the remaining amount shortage time does not fall on a specific time.

In this case, the operation time of an analysis device having a low priority level is changed, so that a shortage of the remaining amount of fluid in the fluid source is prevented from occurring at the specific time. Thus, an analysis device having a high priority level can be operated at the specific time.

(8) An analysis system according to another aspect of the present invention includes one or a plurality of analysis devices that perform an analysis using fluid supplied from a fluid source, and the above-mentioned fluid remaining amount management device that manages a remaining amount of fluid in the fluid source.

In this case, it is possible to determine the time when a shortage of the remaining amount of fluid in the fluid source occurs without directly detecting the remaining amount of fluid in the fluid source and regardless of the number of analysis devices connected to the fluid source. Thus, a shortage of the fluid source can be replaced before the remaining amount of fluid in the fluid source occurs, so that an analysis performed by the analysis device can be prevented from being stopped.

(9) A fluid remaining amount management method according to yet another aspect of the present invention for managing a remaining amount of fluid in a fluid source that supplies fluid to one or a plurality of analysis devices includes estimating transition of a scheduled usage amount of fluid to be used later than a current point in time in the one or plurality of analysis devices and determining a remaining amount shortage time when a shortage of the remaining amount of fluid in the fluid source occurs, based on the estimated transition of the scheduled usage amount.

With the fluid remaining amount management method, it is possible to determine the time when a shortage of the remaining amount of fluid in the fluid source occurs without directly detecting the remaining amount of fluid in the fluid source and regardless of the number of the analysis devices connected to the fluid source. Thus, the fluid source can be replaced before a shortage of the remaining amount of fluid in the fluid source occurs, so that an analysis performed by the analysis device can be prevented from being stopped.

(10) The fluid remaining amount management method may further include reporting a warning indicating that the fluid source is to be replaced, at a time earlier than the remaining amount shortage time determined. In this case, the user is prompted to replace the fluid source. Thus, the user can replace the fluid source before a shortage of the remaining amount of fluid in the fluid source occurs. Therefore, an analysis is prevented from being stopped due to shortage of the remaining amount of fluid.

(11) The reporting may include reporting the warning at the time earlier than a specific time in a case where the determined remaining amount shortage time falls on the specific time.

(12) A non-transitory readable medium storing a fluid remaining amount management program according to yet another aspect of the present invention is a non-transitory readable medium storing a fluid remaining amount management program that manages a remaining amount of fluid in a fluid source that supplies fluid to one or a plurality of analysis devices, the fluid remaining amount managing program causes a computer to execute estimating transition of a scheduled usage amount of fluid to be used later than a current point in time in the one or plurality of analysis devices and determining a remaining amount shortage time when a shortage of the remaining amount of fluid in the fluid source occurs, based on the estimated transition of the scheduled usage amount.

With the non-transitory readable medium storing the fluid remaining management program, it is possible to determine the time when a shortage of the remaining amount of fluid in the fluid source occurs without directly detecting the remaining amount of fluid in the fluid source and regardless of the number of analysis devices connected to the fluid source. Thus, the fluid source can be replaced before a shortage of the remaining amount of fluid in the fluid source occurs, so that an analysis performed by the analysis device can be prevented from being stopped.

Advantageous Effects of Invention

The present invention enables determination of the time when a shortage of a remaining amount of fluid in a fluid source occurs without direct detection of the remaining amount of fluid in the fluid source and regardless of the number of analysis devices connected to the fluid source.

BRIEF DESCRIPTION OF THE DRAWINGS

FIG. 1 is a block diagram showing the configuration of an analysis system according to one embodiment of the present invention.

FIG. 3 is a schematic diagram showing one example of a schedule table.

FIG. 4 is a schematic diagram showing one example of a management screen displayed in a display device of a fluid remaining amount management device of FIG. 1.

FIG. 6 is a flowchart showing the algorithm of a fluid remaining amount management program.

FIG. 7 is a flowchart showing the algorithm of the fluid remaining amount management program.

DESCRIPTION OF EMBODIMENTS

Figure 2:
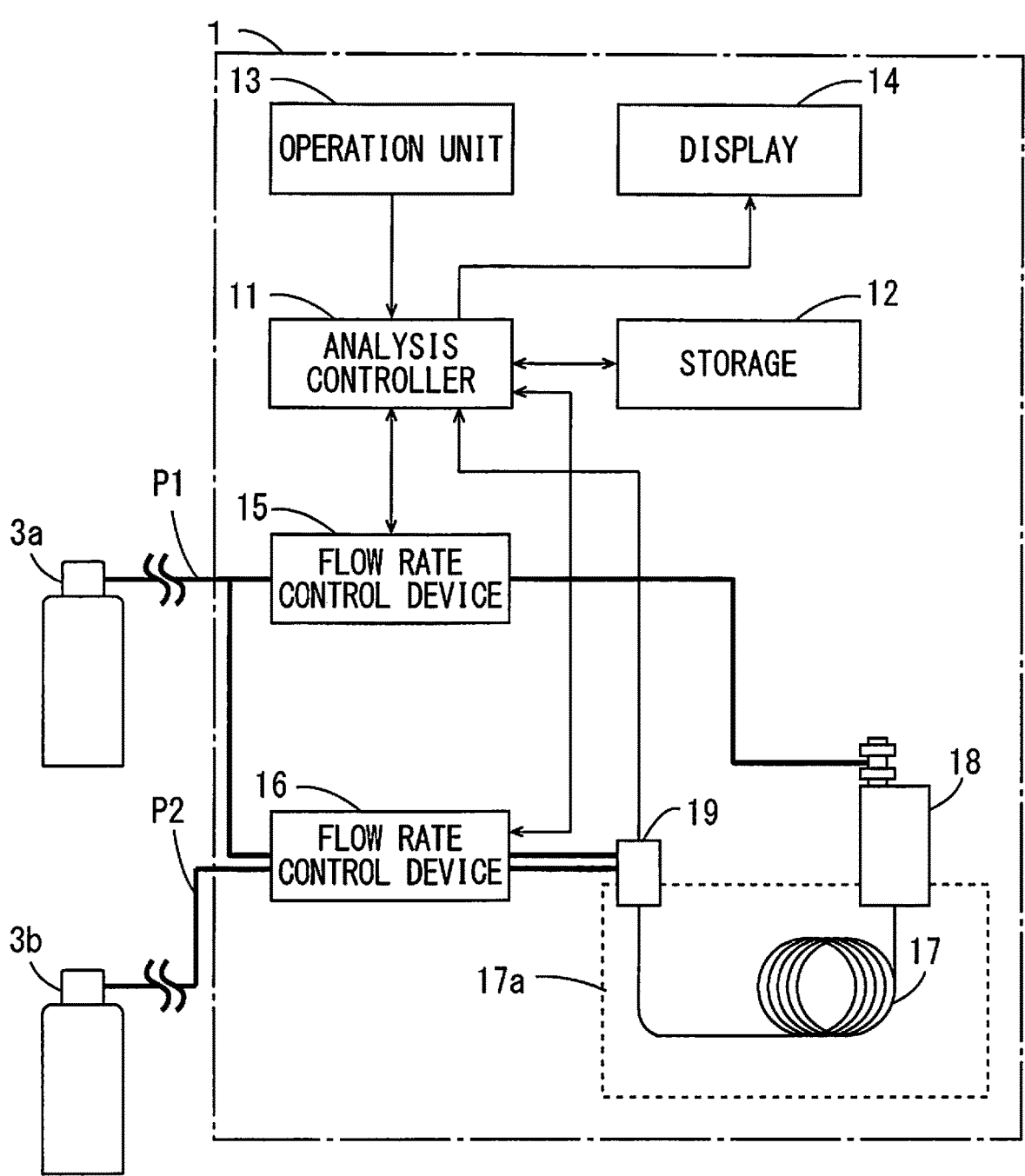
FIG. 2 is a block diagram showing the configuration of an analysis device of FIG. 1.

A fluid remaining amount management device, an analysis system, a fluid remaining amount management method and a non-transitory readable medium storing a fluid remaining amount management program according to embodiments of the present invention will be described below in detail with reference to the drawings.

(1) Configuration of Analysis System

FIG. 1 is a block diagram showing the configuration of the analysis system according to one embodiment of the present invention. The analysis system 100 of FIG. 1 includes one or a plurality of analysis devices 1 and the fluid remaining amount management device 2. In the present embodiment, the fluid remaining amount management device 2 is connected to the plurality of analysis devices 1. In a case where the plurality of analysis devices 1 are to be differentiated from one another, the plurality of analysis devices 1 are hereinafter respectively referred to as analysis devices 1a, 1b, 1c. In the present embodiment, each analysis device 1 is a gas chromatograph, and fluid is gas.

Each of the plurality of analysis devices 1 is connected to gas cylinders 3a, 3b. The gas cylinders 3a, 3b supply a gas that is decompressed through a pressure regulator (not shown) to the plurality of analysis devices 1. The gas cylinder 3a stores He (a helium gas), for example. The gas cylinder 3b stores $H_2$ (a hydrogen gas), for example. The plurality of analysis devices 1 are placed in an analysis chamber. The plurality of analysis devices 1 may be placed in a same analysis chamber or may be placed in different analysis chambers. The gas cylinders 3a, 3b may be placed in an analysis chamber or may be placed outdoors. The fluid remaining amount management device 2 includes a data processing device 21, a storage device 22, an information inputter 23 and a display device 24.

The data processing device 21 is constituted by a CPU (Central Processing Unit), a RAM (Random Access Memory) and a ROM (Read Only Memory) and is a personal computer or a server, for example. The ROM stores the fluid remaining amount management program. Further, the data processing device 21 is connected to the plurality of analysis devices 1, acquires various information such as a schedule table, described below, etc. from each analysis device 1 and supplies various instructions and various information to each analysis device 1.

The storage device 22 includes a storage medium such as a hard disc, an optical disc, a magnetic disc, a semiconductor memory or a memory card and stores schedule information, described below, etc. The storage device 22 may store the fluid remaining amount management program.

The information inputter 23 includes a keyboard, a pointing device, a communication interface and the like and is used to input various information, data or the like. In a case where the information inputter 23 is connected to a communication network such as the Internet, various information such as a weather forecast can be acquired from the Internet and the like. The display device 24 includes a liquid crystal display, an organic electroluminance display or the like and displays various information and images.

(2) Configuration of Analysis Device 1

FIG. 2 is a block diagram showing the configuration of the analysis device 1 of FIG. 1. The analysis device 1 of FIG. 1 includes an analysis controller 11, a storage 12, an operation unit 13 and a display 14. The analysis controller 11 is constituted by a CPU, a RAM and a ROM. The storage 12 includes a storage medium such as a hard disc, an optical disc, a magnetic disc, a semiconductor memory or a memory card and stores various information such as a schedule table, described below. The operation unit 13 includes a keyboard, a pointing device and the like and is used to input various information, data or the like. The display 14 includes a liquid crystal display, an organic electroluminance display or the like and displays various information and images.

The analysis device 1 further includes flow rate control devices 15, 16, a column 17, a sample vaporization chamber 18 and a detector 19. The flow rate control device 15 supplies a helium gas supplied from the gas cylinder 3a through a pipe P1 into the sample vaporization chamber 18 as a carrier gas, for example. A flow rate detection sensor that detects a flow rate of the carrier gas is provided in the flow rate control device 15. The flow rate control device 16 supplies the helium gas supplied from the gas cylinder 3a through the pipe P1 to the detector 19 as a makeup gas and supplies a hydrogen gas supplied from the gas cylinder 3b through a pipe P2 to the detector 19. Flow rate sensors that respectively detect the flow rates of the makeup gas and the hydrogen gas are provided in the flow rate control device 16.

In the present embodiment, a flame ionization detector (FID) or a flame thermionic detector (FTD) is used as the detector 19. In a case where an electron capture detector (ECD) or a thermal conductivity detector (TCD) is used as the detector 19, only the makeup gas (helium gas) from the gas cylinder 3a is supplied to the flow rate control device 16. Further, in a case where a flame photometric detector (FPD) is used as the detector 19, only the hydrogen gas from the gas cylinder 3b is supplied to the flow rate control device 16. In the present embodiment, the column 17 is a capillary column and stored in a column oven 17a.

When an analysis is performed, a sample solution is introduced into the sample vaporization chamber 18. The sample solution is heated to a predetermined temperature in the sample vaporization chamber 18. Thus, the components in the sample solution are vaporized and introduced into the column 17 as a sample gas. The sample gas passes through the column 17 together with the carrier gas, and the components separated in a time direction are introduced into the detector 19. The detector 19 outputs a detection signal corresponding to an amount of each component included in the sample gas to the analysis controller 11.

The flow rate control device 15 controls the flow rate of the carrier gas. The flow rate control device 16 controls the flow rates of the makeup gas and the hydrogen gas. The analysis controller 11 calculates a usage amount of each gas by integrating the flow rate of each gas detected by the flow rate sensors of the flow rate control devices 15, 16 over time. Further, the analysis controller 11 can also calculate a usage amount of each gas used in each analysis based on a flow rate of gas and a period of time during which a gas is supplied that are included in an analysis method file, described below. A usage amount of each gas is stored in the storage 12. The usage amount of each gas that is stored in the storage 12 is always updated every certain period of time or every time an analysis is performed.

(3) Schedule Table

FIG. 3 is a schematic diagram showing one example of the schedule table. The schedule table ST of FIG. 3 shows analysis schedules of one analysis device 1 and is stored in the storage 12 of FIG. 2. One or more analysis schedules are registered in the schedule table ST. Each analysis schedule includes contents of one or more analyses. In the example of FIG. 3, schedule numbers sa1, sa2 that specify a plurality of analysis schedules are included in the schedule table ST. Each of the analysis schedules of the plurality of schedule numbers sa1, sa2 includes a plurality of analyses. One row in the schedule table ST of FIG. 3 corresponds to one analysis. Each analysis is specified by the analysis number, the name of sample, the name of analysis method file, etc. In the analysis method file, analysis conditions such as operating conditions of each component of the analysis device 1 are included. The analysis conditions include the flow rates of the carrier gas, the makeup gas and the hydrogen gas and the periods of time during which the carrier gas, the makeup gas and the hydrogen gas are supplied, for example. In the example of FIG. 3, in the analysis schedule of the schedule number sa1, the analysis number "a1," the name of sample "A" and the name of analysis method file "Method_1" are registered as a first analysis, the analysis number "a2," the name of sample "B" and the name of analysis method file "Method 1" are registered as a second analysis, and the analysis number "a3," the name of sample "C" and the name of analysis method file "Method_1" are registered as a third analysis. Further, in the analysis schedule of the schedule number sa2, the analysis number "b1," the name of sample "D" and the name of analysis method file "Method_2" are registered as a first analysis, the analysis number "b2," the name of sample "E" and the name of analysis method file "Method_2" are registered as a second analysis, and the analysis number "b3", the name of sample "F" and the name of analysis method file "Method_2" are registered as a third analysis. Each analysis method file is stored in the storage 12.

The analysis controller 11 of the analysis device 1 of FIG. 2 controls each component of the analysis device 1 such that the analyses of one or more analysis schedules are performed in order in accordance with the schedule table ST stored in the storage 12. In the display 14, the schedule table ST stored in the storage 12 is displayed. A user can delete an analysis schedule or an analysis registered in the schedule table ST and can register a new analysis schedule or a new analysis in the schedule table ST using the operation unit 13.

The data processing device 21 of the fluid remaining amount management device 2 of FIG. 1 acquires schedule tables ST from the plurality of analysis devices 1 and creates schedule information by integrating the acquired schedule tables ST. The schedule information includes the execution order of one or more analysis schedules, priority levels of the analysis schedules and so on in regard to the plurality of analysis devices 1. The schedule information is displayed on a management screen by the display device 24.

(4) Management Screen

FIG. 4 is a schematic diagram showing one example of the management screen displayed in the display device 24 of the fluid remaining amount management device 2 of FIG. 1.

As shown in FIG. 4, in the management screen AD, the device numbers "1*a*" to "1*c*" of the plurality of analysis devices 1*a* to 1*c* are displayed, and check boxes CHa to CHc respectively corresponding to the device numbers "1*a*" to "1*c*" are displayed. Further, the schedule numbers "sa1" to "sa3" corresponding to the device number "1*a*" are displayed, the schedule numbers "sb1" to "sb3" corresponding to the device number "1*b*" are displayed, and the schedule numbers "sc1" to "sc3" corresponding to the device number "1*c*" are displayed. Further, the check boxes CHa1 to CHa3, CHb1 to CHb3, CHc1 to CHc3 corresponding to the schedule numbers "sa1" to "sa3," "sb1" to "sb3," "sc1" to "sc3" are displayed, respectively. When a check box is checked, a corresponding analysis device 1 or a corresponding analysis schedule is put in a selected state. When a check box is unchecked, a corresponding analysis device 1 or a corresponding analysis schedule is put in an unselected state. An analysis device 1 in the unselected state is not to be operated. Further, an analysis schedule in the unselected state is not to be executed.

In the management screen AD, input fields PR1 to PR3 for priority levels corresponding to the device numbers "1*a*" to "1*c*" are displayed. Further, input fields PR11 to PR13, PR21 to PR23, PR31 to PR33 for the priority levels corresponding to the schedule numbers "sa1" to "sa3," "sb1" to "sb3," "sc1" to "sc3" are displayed. Replacement times of the gas cylinders 3*a*, 3*b* are displayed in display fields 30*a*, 30*b* in the top area of the management screen AD. Further, warning displays 31*a*, 31*b* corresponding to the display fields 30*a*, 30*b* are displayed.

In the example of FIG. 4, the check boxes CHa to CHc are checked. In this case, the analysis devices 1*a*, 1*b*, 1*c* are to be operated. Further, the check boxes CHa1 to CHa3, CHb1 to CHb3, CHc1, CHc2 are checked, and the check box CHc3 is blank. In this case, in the analysis device 1*a*, the analysis schedules of the schedule numbers "sa1" to "sa3" are executed in order. In the analysis device 1*b*, the analysis schedules of the schedule numbers "sb1" to "sb3" are executed in order. In the analysis device 1*c*, the analysis schedules of the schedule numbers "sc1", "sc2" are executed in order, and execution of the analysis schedule of the schedule number "sc3" is put on hold.

The user can input the priority levels in the input fields PR1 to PR3, PR11 to PR13, PR21 to PR23, PR31 to PR33 for the priority levels. In the example of FIG. 4, the priority level of the analysis device 1*a* is higher than the priority levels of the analysis devices 1*b*, 1*c*. The priority level of the analysis schedule of the schedule number "sa1" is higher than the priority levels of the analysis schedules of the schedule number "sb1" and the schedule number "sc1". The data processing device 21 may automatically set the priority level of each analysis device 1 and each analysis schedule.

(5) Functional Configuration of Fluid Remaining Amount Management Device 2

Figure 5:
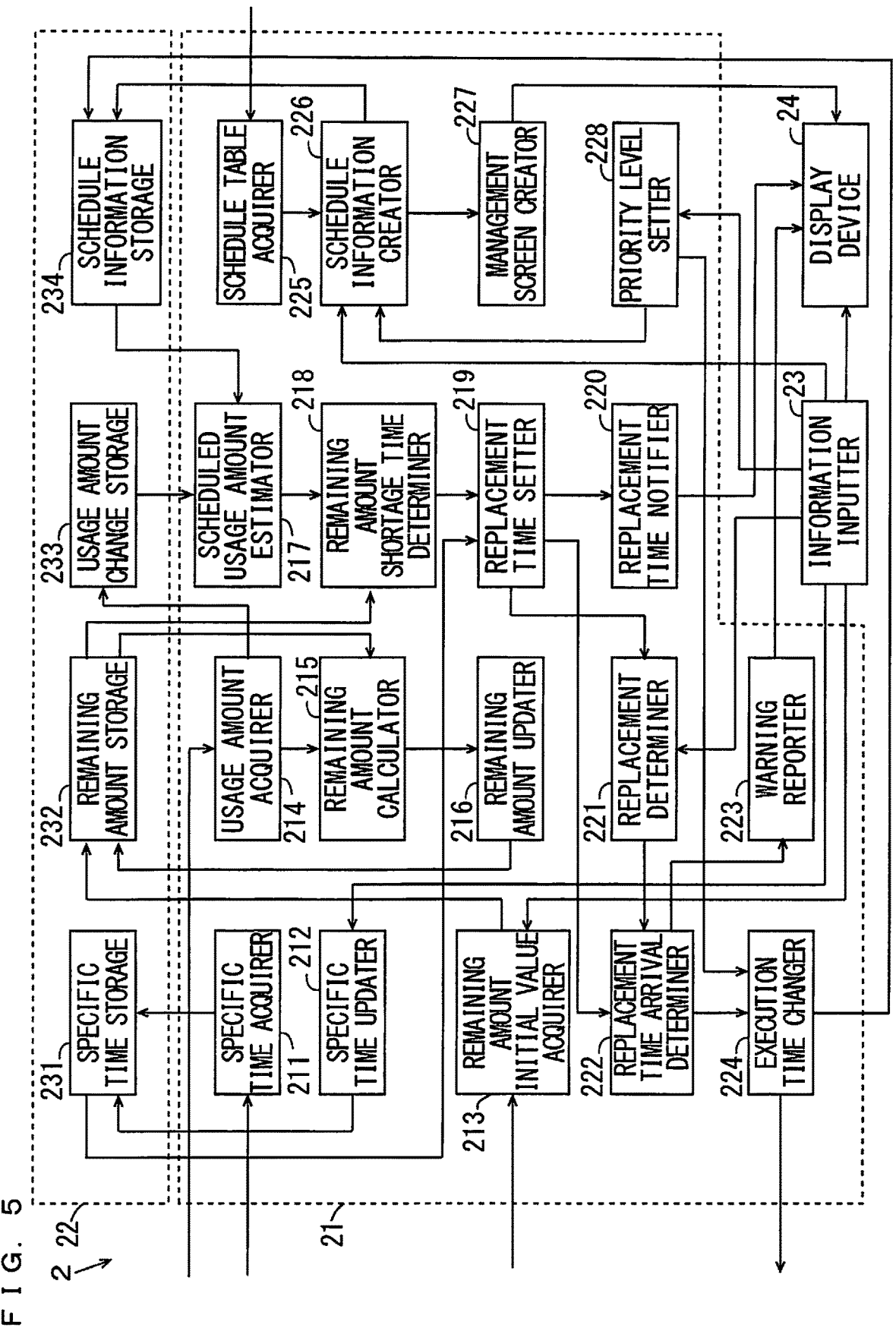
FIG. 5 is a block diagram showing the functional configuration of the fluid remaining amount management device of FIG. 1.

FIG. 5 is a block diagram showing the functional configuration of the fluid remaining amount management device 2 of FIG. 1.

As shown in FIG. 5, the data processing device 21 includes a specific time acquirer 211, a specific time updater 212, a remaining amount initial value acquirer 213, a usage amount acquirer 214, a remaining amount calculator 215 and a remaining amount updater 216. Further, the data processing device 21 includes a scheduled usage amount estimator 217, a remaining amount shortage time determiner 218, a replacement time setter 219, a replacement time notifier 220, a replacement determiner 221, a replacement time arrival determiner 222, a warning reporter 223 and an execution time changer 224. Further, the data processing device 21 includes a schedule table acquirer 225, a schedule information creator 226, a management screen creator 227 and a priority level setter 228. The functions of the above-mentioned constituent elements (221 to 227) are implemented by execution of the fluid remaining amount management program which is a computer program stored in a storage medium (recording medium) such as the ROM or the storage device 22 by the CPU. Part or all of the fluid remaining amount management device 2 may be realized by hardware such as an electronic circuit.

The storage device 22 includes a specific time storage 231, a remaining amount storage 232, a usage amount change storage 233 and a schedule information storage 234.

The specific time acquirer 211 acquires a specific time based on calendar information. In this case, the specific time includes Saturdays, Sundays, national holidays and days off. Further, the specific time acquirer 211 may acquire a weather forecast through the Internet, etc. and may acquire rainy days as the specific time based on the acquired weather forecast. The specific time storage 231 stores the specific time acquired by the specific time acquirer 211. The specific time updater 212 updates the specific time stored in the specific time storage 231. For example, the specific time updater 212 updates the specific time based on the calendar information of a new year when a new year begins. Further, the specific time updater 212 updates the specific time when a weather forecast is updated. The user can set or change the specific time using the information inputter 23.

The user inputs the amounts of gas stored in new gas cylinders 3a, 3b as remaining amount initial values using the information inputter 23 when used gas cylinders 3a, 3b are replaced with the new gas cylinders 3a, 3b. The amounts of gas in the gas cylinders 3a, 3b are represented by a volume of gas or a pressure of gas. The remaining amount initial value acquirer 213 acquires the input remaining amount initial values. The remaining amount storage 232 stores the remaining amount initial value of each of the gas cylinders 3a, 3b as a remaining amount. The usage amount acquirer 214 acquires the usage amount of each gas from each analysis device 1. In this case, each analysis device 1 may regularly transmit the usage amount of each gas to the fluid remaining amount management device 2, and the usage amount acquirer 214 may acquire the received usage amount. Alternatively, the usage amount acquirer 214 may request each analysis device 1 to transmit a usage amount, and the usage amount acquirer 214 may acquire the usage amount transmitted by each analysis device 1 in accordance with the request.

The remaining amount calculator 215 calculates the total usage amount of each gas in the plurality of analysis devices 1 based on the usage amount of each gas acquired by the usage amount acquirer 214. The remaining amount updater 216 updates the remaining amount of each gas stored in the remaining amount storage 232 by subtracting the total usage amount calculated by the remaining amount calculator 215 from the remaining amount stored in the remaining amount storage 232.

Further, the usage amount change storage 233 stores the temporal change of the usage amount of each gas acquired by the usage amount acquirer 214. The scheduled usage amount estimator 217 estimates the transition (change) of the scheduled usage amount of each gas later than a current point in time based on the change of the usage amount of each gas stored in the usage amount change storage 233. The transition of the scheduled usage amount is represented by a linear function or a high order function, for example. Alternatively, the scheduled usage amount estimator 217 estimates the transition of the scheduled usage amount of each gas later than a current point in time based on the flow rate and the supply period of time of each gas in the analysis method files specified by the schedule table ST acquired from each analysis device 1.

The remaining amount shortage time determiner 218 calculates the time when shortage of the remaining amount in each of the gas cylinders 3a, 3b occurs as a remaining amount shortage time based on the remaining amount of each gas stored in the remaining amount storage 232 and the transition of the scheduled usage amount of each gas estimated by the scheduled usage amount estimator 217. Here, the shortage of the remaining amount does not only refers to a case where the remaining amount in each of the gas cylinders 3a, 3b is 0 but also refers to a case where the remaining amount in each of the gas cylinder 3a, 3b is less than the amount required for completing one analysis schedule.

The replacement time setter 219 sets the replacement time of each of the gas cylinders 3a, 3b based on the remaining amount shortage time calculated by the remaining amount shortage time determiner 218 and the specific time stored in the specific time storage 231. In a case where the remaining amount replacement time falls on the specific time, the replacement time is set to a predetermined number of days before the specific time. The predetermined number of days is set in consideration of the period of time required from ordering to connecting the gas cylinders 3a, 3b on the assumption that the gas cylinders 3a, 3b are out of stock, for example. The replacement time notifier 220 controls the display device 24 such that the replacement time of each of the gas cylinders 3a, 3b set by the replacement time setter 219 is displayed on the management screen AD of FIG. 4. Further, the replacement time notifier 220 provides an instruction to the analysis controller 11 of each analysis device 1 such that the replacement time of each of the gas cylinders 3a, 3b is displayed in the display 14 of each analysis device 1. The replacement time notifier 220 may cause the display device 24 or the display 14 to display the replacement time of each of the gas cylinders 3a, 3b at all times, or at the time of the arrival of the replacement time or in the period of time from a predetermined number of days before arrival of the replacement time to arrival of the replacement time.

The schedule table acquirer 225 acquires the schedule tables ST from the plurality of analysis devices 1. The schedule information creator 226 creates the schedule information by integrating the schedule tables ST of the plurality of analysis devices 1 acquired by the schedule table acquirer 225. The schedule information storage 234 stores the schedule information created by the schedule information creator 226. In a case where a user of each analysis device 1 updates the schedule table ST, the schedule information creator 226 updates the schedule information stored in the schedule information storage 234 based on the schedule tables ST acquired by the schedule table acquirer 225.

The management screen creator 227 creates the management screen AD based on the schedule information stored in the schedule information storage 234 and causes the display device 24 to display the created management screen AD. In a case where the user changes the presence or absence of a check in each of the check boxes CHa to Chc, CHa1 to CHa3, CHb1 to CHb3, CHc1 to CHc3 in the management screen AD, the schedule information creator 226 updates the schedule information stored in the schedule information storage 234.

The user can set the priority levels for the plurality of analysis devices 1 and the plurality of analysis schedules in the management screen AD using the information inputter 23. The priority level setter 228 sets the priority level input by the information inputter 23 for each analysis device 1 and each analysis schedule.

The replacement determiner 221 determines whether the gas cylinders 3a, 3b connected to the plurality of analysis devices 1 have been replaced with the new gas cylinders 3a, 3b. For example, when replacing each of the gas cylinders 3a, 3b, the user informs the data processing device 21 of replacement of the gas cylinder 3a, 3b using the information inputter 23 and inputs the remaining amount initial values of the new gas cylinders 3a, 3b using the information inputter 23.

The replacement time arrival determiner 222 determines whether the replacement times of the gas cylinders 3a, 3b have arrived. In a case where the replacement times have arrived without replacement of the gas cylinders 3a, 3b, the warning reporter 223 reports the warning indicating that the used gas cylinders 3a, 3b are to be replaced with the new gas cylinders 3a, 3b using the display device 24. Further, the warning reporter 223 may cause the display 14 of each analysis device 1 to display the warning. In the present embodiment, one or both of the warning displays 31a, 31b of FIG. 4 blink. The method of reporting a warning is not limited to the method of the present embodiment. The warning may be displayed in characters or the warning may be reported by voice.

In a case where the gas cylinders 3a, 3b are not replaced in a certain period of time after blinking of the warning displays 31a, 31b, the execution time changer 224 changes the operation time of part of the analysis devices 1 or the execution time of part of the analysis schedules based on the priority levels set by the priority level setter 228. Specifically, the execution time changer 224 stops the operation of the analysis device 1 having a low priority level or holds the execution of an analysis schedule having a low priority level. Thus, the analysis device 1 having a high priority level can be operated or the analysis schedule having a high priority level can be executed without shortage of the remaining amount of each gas. In this case, the replacement time of the gas cylinders 3a, 3b is postponed. The analysis device 1 that has been stopped is operated and the analysis schedule that has been put on hold is executed after replacement of the gas cylinders 3a, 3b.

(6) Fluid Remaining Amount Management Program

Figures 8, 9:
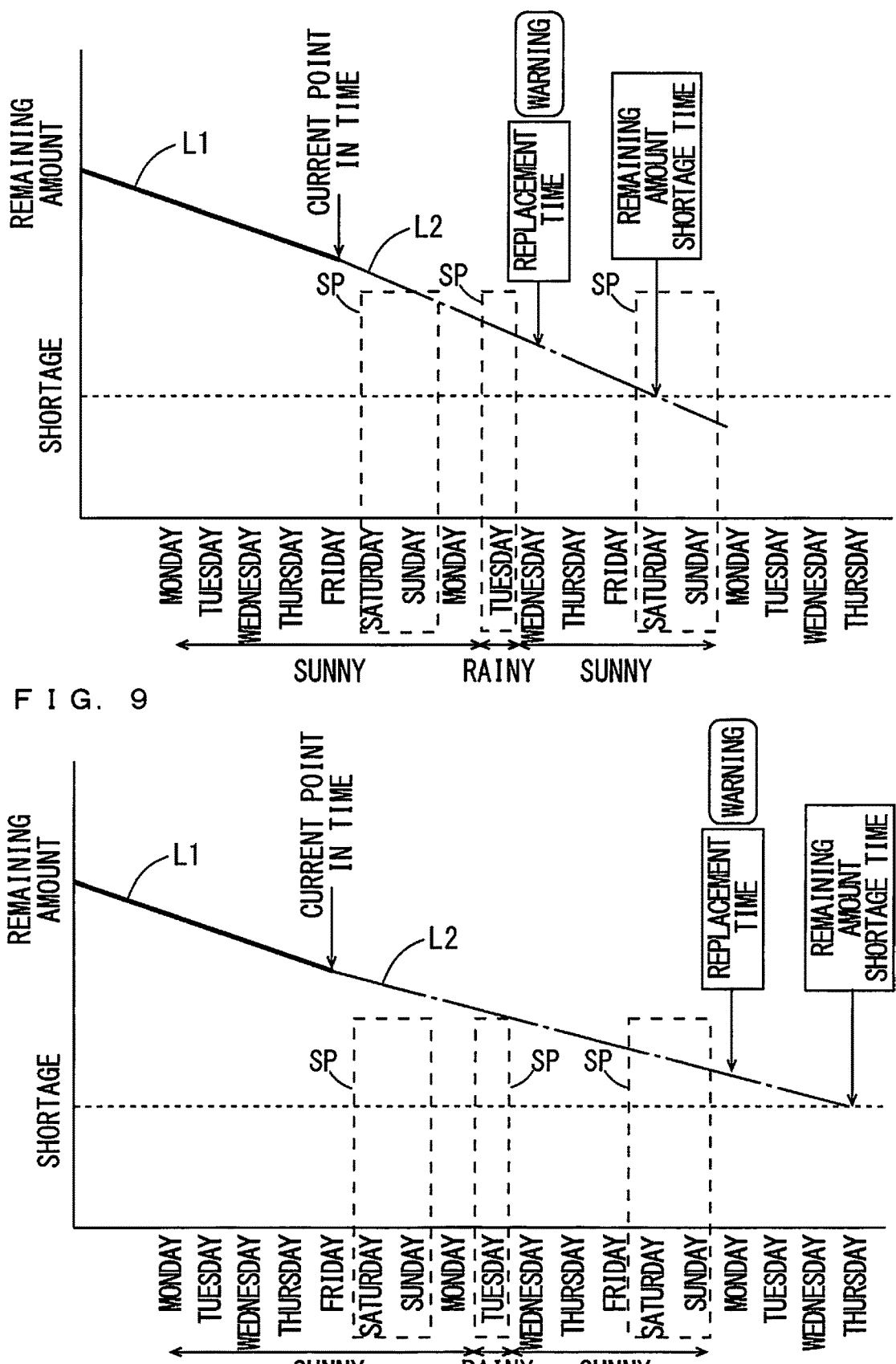
FIG. 8 is a diagram for explaining the relationship among a remaining amount shortage time, a replacement time and a specific time.
FIG. 9 is a diagram for explaining the relationship among the remaining amount shortage time, the replacement time and the specific time.

FIGS. 6 and 7 are flow charts showing the algorithm of the fluid remaining amount management program. Further, FIGS. 8 and 9 are diagrams for explaining the relationship among the remaining amount shortage time, the replacement time and the specific time. The fluid remaining amount management method for the gas cylinder 3a will be described below. The same is true for the fluid remaining amount management method for the gas cylinder 3b.

First, the specific time acquirer 211 of FIG. 5 acquires a specific time (step S1) and causes the specific time storage 231 to store the acquired specific time (step S2). In the present embodiment, the specific time include Saturdays, Sundays, national holidays and days off, and rainy days according to a weather forecast. In the example of FIG. 8, Saturdays, Sundays and rainy days are the specific time SP.

Here, when replacing a used gas cylinder 3a with a new gas cylinder 3a, the user inputs an amount of gas stored in the new gas cylinder 3a as a remaining amount initial value using the information inputter 23. The remaining amount initial value acquirer 213 acquires the input remaining amount initial value (step S3) and causes the remaining amount storage 232 to store the acquired remaining amount initial value as a remaining amount (step S4).

Next, the specific time updater 212 determines whether the specific time has been updated through the information inputter 23 (step S5). For example, whether the specific time such as days offs has been changed by the user using the information inputter is determined. Further, whether the rainy days have been changed due to a change in weather forecast is determined. In a case where the specific time has not been updated, the specific time updater 212 proceeds to the step S7. In a case where the specific time has been updated, the specific time updater 212 updates the specific time stored in the specific time storage 231 (step S6).

The usage amount acquirer 214 acquires the usage amount of gas from the previous time when the usage amount of gas is acquired to a current point in time from each of the plurality of analysis devices 1 (step S7). The remaining amount calculator 215 calculates the remaining amount of gas in the gas cylinder 3a by subtracting the total usage amount in the plurality of analysis devices 1 from the remaining amount stored in the remaining amount storage 232 (step S8). The remaining amount updater 216 updates the remaining amount stored in the remaining amount storage 232 with the remaining amount calculated by the remaining amount calculator 215 (step S9). In the example of FIG. 8, the change in remaining amount earlier than the current point in time is indicated by the thick solid line L1.

The schedule table acquirer 225 acquires the schedule tables ST from the plurality of analysis devices 1 (step S10). The schedule information creator 226 creates the schedule information by integrating the acquired schedule tables ST of the plurality of analysis devices 1a to 1c. The schedule information creator 226 causes the schedule information storage 234 to store the created schedule information (step S12). The management screen creator 227 creates the management screen AD based on the schedule information stored in the schedule information storage 234 and causes the display device 24 to display the created management screen AD (step S13).

The user can input the priority levels in the input fields PR1 to PR3, PR11 to PR 13, PR21 to PR23, PR31 to PR33 of the management screen AD using the information inputter 23. The priority level setter 228 determines whether the priority levels are input by the user on the management screen AD (step S14). In a case where the priority levels are input, the priority level setter 228 sets the priority level of each analysis device 1 or each analysis schedule in the schedule information (step S15). In a case where the priority levels are not input in the step S14, the step 15 is skipped.

The schedule information creator 226 determines whether the selection state of each analysis device 1 or each analysis schedule has been changed in the management screen AD (step S16). In a case where the selection state of each analysis device 1 or each analysis schedule has been changed, the schedule information creator 226 returns to the step S11 and updates the schedule information. Thereafter, the process of the steps S12 to S16 is performed.

The schedule table acquirer 225 determines whether a schedule table ST has been changed in any of the analysis devices 1 (step S17). For example, the user can add, change or delete an analysis schedule in the schedule table ST of FIG. 3. In a case where a schedule table ST has been changed in any of the analysis devices 1, the schedule table acquirer 225 returns to the step S10 and acquires the changed schedule table ST. Thereafter, the process of the steps S11 to S17 is performed.

In a case where a schedule table ST has not been changed in any of the plurality of analysis devices 1, the scheduled usage amount estimator 217 estimates the transition of the scheduled usage amount of gas later than a current point in time. In FIG. 8, the transition of the scheduled usage amount of gas later than the current point in time is indicated by the dot and dashed line.

The remaining amount shortage time determiner 218 calculates the remaining amount shortage time based on the remaining amount stored in the remaining amount storage 232 and the transition of the scheduled usage amount that is estimated by the scheduled usage amount estimator 217 (step S19). In the example of FIG. 8, the remaining amount shortage time falls on Saturday which is the specific time SP.

The replacement time setter 219 determines whether the remaining amount shortage time falls on the specific time (step S20). In the example of FIG. 8, the remaining amount shortage time falls on Saturday which is the specific time SP. In a case where the remaining amount shortage time falls on the specific time, the replacement time setter 219 sets the replacement time to a predetermined number of days before the remaining amount shortage time (step S21). In the example of FIG. 8, the replacement time is set to Wednesday which is three days before Saturday which is the specific time SP.

In a case where the remaining amount shortage time does not fall on the specific time, the replacement time setter 219 sets the replacement time to a predetermined number of days before the remaining amount shortage time (step S22). The replacement time notifier 220 makes notification of the replacement time set by the replacement time setter 219 using the display device 24 (step S23). For example, the replacement time of the gas cylinder 3a is displayed in the display field 30a of the management screen AD of FIG. 4. The replacement time of the gas cylinder 3a may be displayed in the display 14 of each analysis device 1. Further, notification of the replacement time may be made by voice.

Next, the replacement determiner 221 determines whether the used gas cylinder 3a is replaced with the new gas cylinder 3a (step S24). In a case where the used gas cylinder 3a has been replaced with the new gas cylinder 3a, the replacement determiner 221 returns to the step S3, and the remaining amount initial value acquirer 213 acquires the remaining amount initial value of the new gas cylinder 3a. Thereafter, the process of the steps S4 to S24 is performed.

In a case where the used gas cylinder 3a has not been replaced with the new gas cylinder 3a, the replacement time arrival determiner 222 determines whether the replacement time has arrived (step S25). In a case where the replacement time has not arrived, the replacement time arrival determiner 222 returns to the step S7, and the usage amount acquirer 214 acquires the usage amount of gas in each analysis device 1. Thereafter, the process of the steps S8 to S25 is performed.

In a case where the replacement time has arrived in the step S25, the warning reporter 223 reports the warning using the display device 24 (step S26). In the example of FIG. 8, in a case where the replacement time has arrived without replacement of the used gas cylinder 3a with the new gas cylinder 3a, a warning is reported at the replacement time. Specifically, the warning display 31a of the management screen AD of FIG. 4 blinks. Further, warning is reported by the display 14 of each analysis device 1.

After a certain period of time, the replacement determiner 221 determines whether the used gas cylinder 3 has been replaced with the new gas cylinder 3a (step S27). In a case where the used gas cylinder 3a has been replaced with the new gas cylinder 3a, the replacement determiner 221 returns to the step S3, and the remaining amount initial value acquirer 213 acquires the remaining amount initial value of the new gas cylinder 3a. Thereafter, the process of the steps S4 to S27 is performed.

In the step S27, in a case where the used gas cylinder 3a has not been replaced with the new gas cylinder 3a, the execution time changer 224 changes the operation time of at least part of the analysis devices 1 or the execution time of at least part of the analysis schedules based on the priority levels set by the priority level setter 228 (step S28). Specifically, the operation of an analysis device 1 having a low priority level or the execution of an analysis schedule having a low priority level is stopped. For example, the execution time changer 224 unchecks the check box corresponding to the analysis device 1 or the analysis schedule having a low priority level in the management screen AD of FIG. 4. Thus, the corresponding analysis device 1 or the corresponding analysis schedule is put in the unselected state. The execution time changer 224 instructs the analysis device 1 put in the unselected state or the analysis device corresponding to the analysis schedule put in the unselected state to change the schedule table ST. After the schedule table ST is changed, the execution time changer 224 returns to the step S10, and the schedule table acquirer 225 acquires the changed schedule table ST. Thereafter, the process of the step S11 to S28 is performed.

In the above-mentioned step S16, in a case where any of the analysis devices 1 or any of the analysis schedules is changed to the unselected state by unchecking of any of the check boxes in the management screen AD, the transition of the remaining amount later than a current point in time is changed as indicated by the dot and dashed line L2 in FIG. 9. In the example of FIG. 9, the remaining amount shortage time is changed from Saturday in the example of FIG. 8 to Thursday in the following week. Thus, the remaining amount shortage time does not fall on the specific time SP. In this case, the replacement time is reset to Monday, and a warning is reported when the replacement time which is Monday arrives.

(7) Effects of Embodiments

With the fluid remaining amount management device 2 according to the present embodiment, the transition of the scheduled usage amount of gas to be used later than a current point in time in the one or plurality of analysis devices 1 is estimated, and the remaining amount shortage time is determined based on the transition of the estimated scheduled usage amount. In this case, the remaining amount shortage time of gas in each of the gas cylinders 3a, 3b is determined without direct detection of the remaining amount of gas in each of the gas cylinders 3a, 3b and regardless of the number of analysis devices 1 connected to each of the gas cylinders 3a, 3b. Further, a warning is reported at the replacement time of each of the gas cylinders 3a, 3b. Thus, the user is prompted to replace each of the gas cylinders 3a, 3b. Therefore, the user can order or replace each of the gas cylinders 3a, 3b before a shortage of the remaining amount of gas in each of the gas cylinders 3a, 3b occurs. As a result, an analysis is prevented from being stopped due to shortage of the remaining amount of gas.

Further, notification of the replacement time of each of the gas cylinders 3a, 3b is made. Thus, the user can identify the replacement time of each of the gas cylinders 3a, 3b in advance.

In a case where the remaining amount shortage time falls on the specific time, the user is notified of the time earlier than the specific time as the replacement time. Further, a warning is reported in a case where the replacement time earlier than the specific time has arrived. Thus, in a case where it is difficult to replace each of the gas cylinders 3a, 3b at the specific time, each of the gas cylinders 3a, 3b can be replaced in advance. Therefore, the analysis device 1 is prevented from being stopped at the specific time. As a result, downtime of the analysis device 1 can be reduced.

Further, in a case where each of the gas cylinders 3a, 3b is not replaced before the remaining amount shortage time of each of the gas cylinders 3a, 3b, the operation time of an analysis device 1 having a low priority level or the execution time of an analysis schedule having a low priority level is changed. Thus, the operation of an analysis device 1 having a high priority level can continue or an analysis schedule having a high priority level can be executed. As a result, downtime of the analysis device 1 can be reduced.

Further, the operation time of at least part of the analysis devices 1 or the execution time of at least part of the analysis schedules is changed based on the priority levels such that the remaining amount shortage time does not fall on the specific time. In this case, an analysis device 1 having a low priority level is stopped or the execution of an analysis schedule having a low priority level is put on hold, whereby a shortage of the remaining amount of gas in each of the gas cylinders 3a, 3b is prevented from occurring at the specific time. Thus, an analysis device 1 having a high priority level can be operated at the specific time, or an analysis schedule having a high priority level can be executed at the specific time.

(8) Other Embodiments (8-1) While fluid is a helium gas or a hydrogen gas in the above-mentioned embodiment, fluid may be another gas such as $N_2$ (a nitrogen gas) or Ar (an argon gas). Further, fluid may be liquid such as a liquid carbon or a liquid nitrogen. While the analysis devices 1 are gas chromatographs in the above-mentioned embodiment, the analysis devices 1 are not limited to gas chromatographs. The analysis devices 1 may be other analysis devices that perform analyses using fluid. For example, the present invention can also be applied in a case where the analysis devices 1 are gas chromatograph mass spectrometers, total organic carbon analyzers (TOC) or supercritical fluid chromatographs (SFC), for example.

(8-2) While the fluid remaining amount management device 2 is provided separately from the plurality of analysis devices 1 in the above-mentioned embodiment, any of the analysis devices 1 may include the fluid remaining amount management device 2.

(8-3) While the warning is reported when the set replacement time arrives in the above-mentioned embodiment, the warning may be reported from a certain period of time before the replacement time to the replacement time.

(9) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. However, the present invention is not limited to the below-mentioned examples. In the above-mentioned embodiment, the gas cylinders 3a, 3b are an example of a fluid source, the scheduled usage amount estimator 217 is an example of an estimator, the remaining amount shortage time determiner 218 is an example of a determiner and the warning reporter 223 is an example of a reporter. Further, the priority level setter 228 is an example of a first or second setter, and the execution time changer 224 is an example of a first or second changer. As each of constituent elements recited in the claims, various other elements having configurations or functions described in the claims can be also used.

The invention claimed is:

1. A fluid remaining amount management device that manages a remaining amount of fluid in a fluid source that supplies fluid to one or a plurality of analysis devices that analyze a sample, comprising:

an estimator that estimates transition of a scheduled usage amount of fluid to be used later than a current point in time in the one or plurality of analysis devices;

a determiner that determines a remaining amount shortage time when a shortage of the remaining amount of fluid in the fluid source occurs, based on the transition of the scheduled usage amount that is estimated by the estimator;

a first setter that automatically sets priority levels for a plurality of analysis schedules in the one or plurality of analysis devices; and a first changer that automatically changes an execution time of at least part of the analysis schedules based on the priority levels set by the first setter such that the remaining amount shortage time does not fall on a specific time, the execution time being a time at which the one or plurality of analysis devices analyze the sample, wherein the fluid is a mobile phase for guiding the sample to the one or plurality of analysis devices.

2. The fluid remaining amount management device according to claim 1, further comprising a reporter that reports a warning indicating that the fluid source is to be replaced, at a time earlier than the remaining amount shortage time determined by the determiner.

3. The fluid remaining amount management device according to claim 1, wherein the estimator estimates the transition of the scheduled usage amount based on a change in usage amount of fluid in the past in regard to the one or plurality of analysis devices.

4. The fluid remaining amount management device according to claim 1, wherein the estimator estimates the transition of the scheduled usage amount based on an analysis schedule in each of the one or plurality of analysis devices.

5. The fluid remaining amount management device according to claim 2, wherein the reporter reports the warning at the time earlier than the specific time in a case where the remaining amount shortage time determined by the determiner falls on the specific time.

6. The fluid remaining amount management device according to claim 1, further comprising:

a second setter that sets a priority level for each of the plurality of analysis devices; and a second changer that changes an operation time of at least part of the analysis devices based on the priority levels set by the second setter such that the remaining amount shortage time does not fall on the specific time.

7. An analysis system comprising:

one or a plurality of analysis devices that perform an analysis using fluid supplied from a fluid source; and the fluid remaining amount management device according to claim 1 that manages a remaining amount of fluid in the fluid source.

8. A fluid remaining amount management method for managing a remaining amount of fluid in a fluid source that supplies fluid to one or a plurality of analysis devices that analyze a sample, including:

estimating transition of a scheduled usage amount of fluid to be used later than a current point in time in the one or plurality of analysis devices;

determining a remaining amount shortage time when a shortage of the remaining amount of fluid in the fluid source occurs, based on the estimated transition of the scheduled usage amount;

automatically setting priority levels for a plurality of analysis schedules in the one or plurality of analysis devices; and automatically changing an execution time of at least part of the analysis schedules based on the priority levels such that the remaining amount shortage time does not fall on a specific time, the execution time being a time at which the one or plurality of analysis devices analyze the sample, wherein the fluid is a mobile phase for guiding the sample to the one or plurality of analysis devices.

9. The fluid remaining amount management method according to claim 8, further including reporting a warning indicating that the fluid source is to be replaced, at a time earlier than the remaining amount shortage time determined.

10. The fluid remaining amount management method according to claim 9, wherein the reporting includes reporting the warning at the time earlier than a specific time in a case where the determined remaining amount shortage time falls on the specific time.

11. A non-transitory readable medium storing a fluid remaining amount management program that manages a remaining amount of fluid in a fluid source that supplies fluid to one or a plurality of analysis devices that analyze a sample, the fluid remaining amount management program causing a computer to execute:

estimating transition of a scheduled usage amount of fluid to be used later than a current point in time in the one or plurality of analysis devices;

determining a remaining amount shortage time when a shortage of the remaining amount of fluid in the fluid source occurs, based on the estimated transition of the scheduled usage amount;

automatically setting priority levels for a plurality of analysis schedules in the one or plurality of analysis devices; and automatically changing an execution time of at least part of the analysis schedules based on the priority levels such that the remaining amount shortage time does not fall on a specific time, the execution time being a time at which the one or plurality of analysis devices analyze the sample, wherein the fluid is a mobile phase for guiding the sample to the one or plurality of analysis devices.

* * * * *